United States Patent [19]

Cole

[11] 4,172,356
[45] Oct. 30, 1979

[54] YARD RAKE

[75] Inventor: John R. Cole, Liberty, Mo.

[73] Assignee: Westland Industries, Inc., Liberty, Mo.; a part interest

[21] Appl. No.: 846,155

[22] Filed: Oct. 27, 1977

[51] Int. Cl.² ............................................. A01D 77/06
[52] U.S. Cl. ........................................ 56/377; 56/380
[58] Field of Search ............... 56/377, 17.2, 209, 249, 56/381, 380, 384, 15.4, 15.5, 14.9, 16.7

[56] References Cited

U.S. PATENT DOCUMENTS

| | | | |
|---|---|---|---|
| 1,475,223 | 11/1923 | Cushman | 56/15.9 |
| 1,656,517 | 1/1928 | Goulet | 56/17.2 |
| 2,040,605 | 5/1936 | Harder | 56/15.4 |
| 2,514,861 | 7/1950 | Hackerott | 56/17.2 |
| 2,848,859 | 8/1958 | Abel | 56/17.2 |
| 2,924,061 | 2/1960 | Kowalik | 56/377 |
| 2,929,187 | 3/1960 | Boggio | 56/377 |
| 2,934,883 | 5/1960 | Morkowski | 56/377 |
| 2,945,338 | 7/1960 | Burrows et al. | 56/17.2 |
| 2,972,218 | 2/1961 | Benson | 56/249 |
| 2,991,613 | 7/1961 | Breed | 56/377 |
| 3,009,306 | 11/1961 | Hauswirth et al. | 56/377 |
| 3,103,777 | 9/1963 | Harbage et al. | 56/377 |
| 3,321,895 | 5/1967 | Morkowski | 56/377 |
| 3,332,222 | 7/1967 | Heinlein | 56/377 |
| 3,453,813 | 7/1969 | Rikoff | 56/377 |
| 3,545,187 | 12/1970 | Whitney | 56/16.7 |
| 3,811,255 | 5/1974 | Ferguson | 56/249 |
| 3,921,373 | 11/1975 | Rubin | 56/16.7 |
| 4,028,868 | 6/1977 | Zehrung, Jr. | 56/17.2 |

Primary Examiner—Louis G. Mancene
Assistant Examiner—Paul J. Hirsch
Attorney, Agent, or Firm—Fishburn, Gold & Litman

[57] ABSTRACT

A raking mechanism is disclosed which comprises a side delivery raking means mounted on a frame having three support wheels. The mechanism can be self-propelled or towed for raking and/or dethatching mowed lawns, with clipped foliage being discharged to one side and deposited in windrows. A steerable first support wheel is located toward the front end of the frame, whereas second and third support wheels are located adjacent the ends of a wheel suspension means that is pivotally attached to the rear of the frame. The second support wheel is mounted on a nonpivotable axle and rotates in a plane that is parallel to the line of draft of the mechanism, and the third support wheel is freely pivotable on a vertical axis. The side delivery raking means is immobilized against vertical movement with respect to the frame, but the rear of the frame can be electively raised or lowered to a preferred elevation for adjusting the height of the raking means relative to the surface of the ground.

20 Claims, 6 Drawing Figures

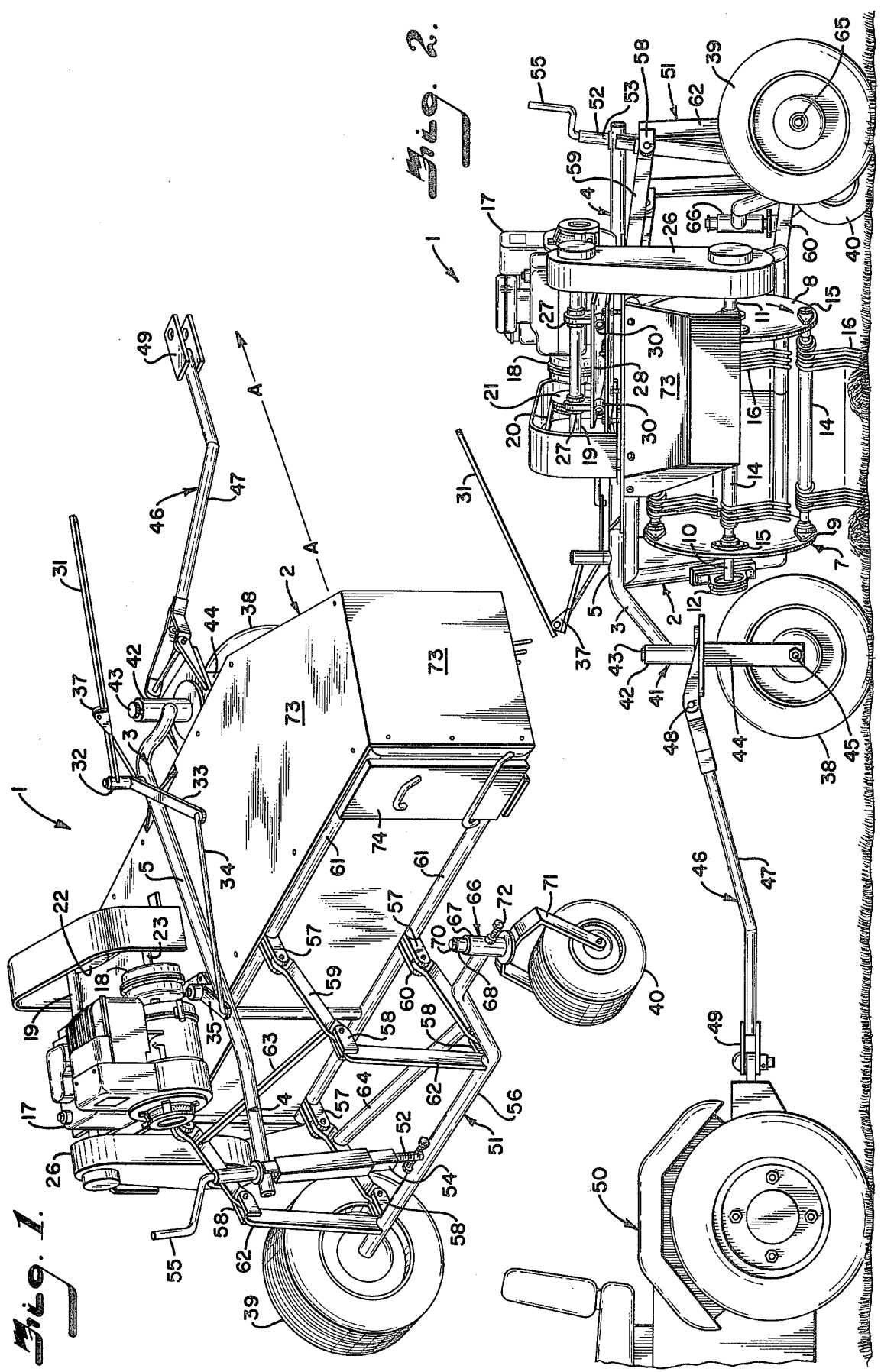

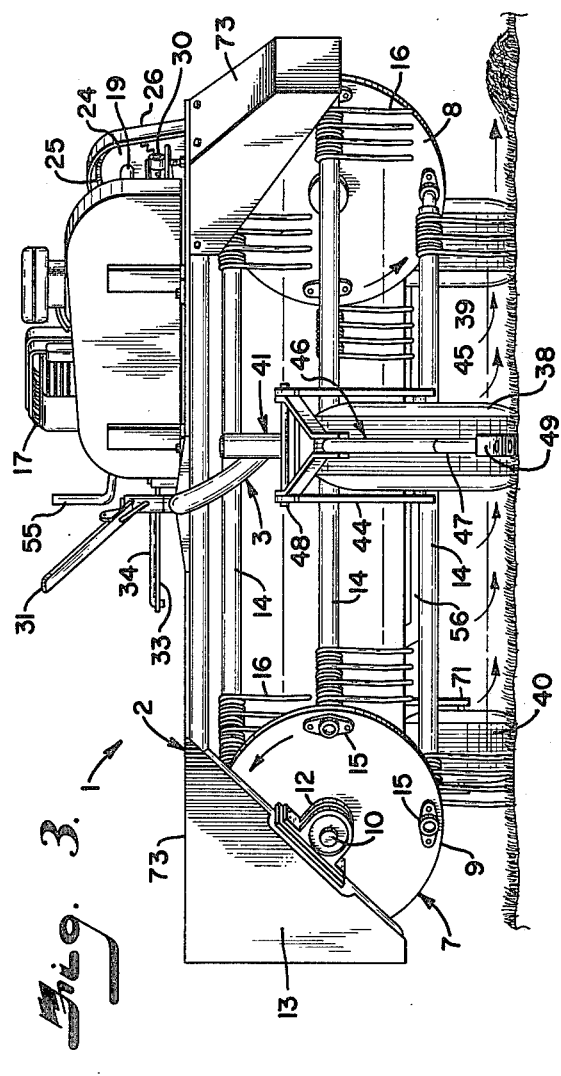
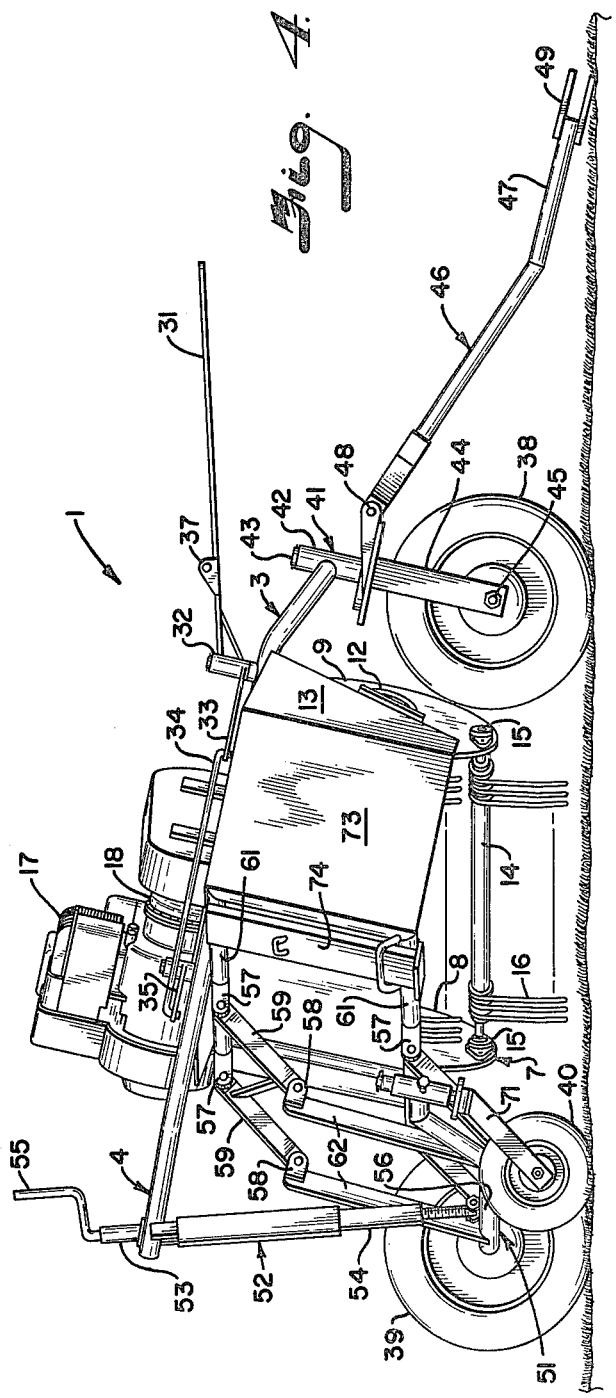

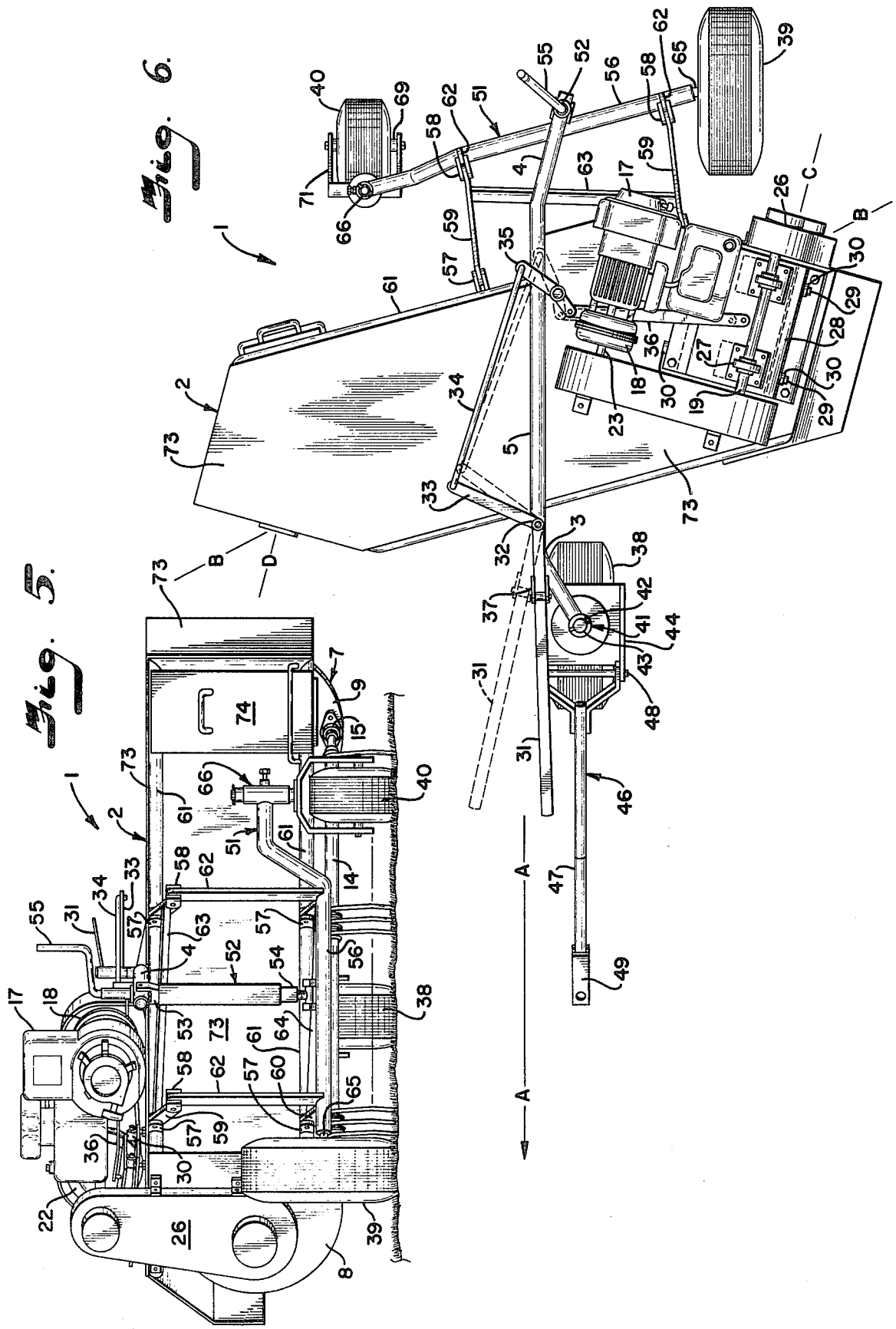

YARD RAKE

BACKGROUND OF THE INVENTION

The present invention pertains to raking devices, and more particularly pertains to devices employed for raking and/or dethatching cultivated stands of grass following the trimming thereof with a mower.

Proper maintenance of lawns or larger expanses of turf requires the removal of grass clippings therefrom following mowing operations. Not only should clippings be removed from the upper surface of mowed grass, but "dethatching" is also needed for dislodgement and collection of fresh or decaying clippings which become embedded in the uncut foilage and form an undesirable mat that harbors disease organisms and pests, and smothers the root system of the plant stem. Lawn sweepers or brushes do not always provide sufficiently rapid or efficient cleaning of large expanses of mowed grass, or adequately clean out clippings that have become embedded in the uncut foilage. On the other hand, previously available side delivery raking machines provide little or no control over the ground clearance of the raking tines, so that depressed portions of the ground are not adequately raked, and raised portions become scalped by the tines.

SUMMARY OF THE INVENTION

One object of the present invention is to provide an improved apparatus for raking grass.

Another object is to provide a grass raking apparatus whereby grass clippings are raked into windrows.

Still another object is to provide a raking apparatus which removes embedded clippings from uncut grass foilage while also raking clippings which reside on top of the foilage.

Yet another object is to provide a grass raking apparatus wherein ground clearance or contact of the raking tines with ground can be adjusted to provide maximum thatch removal with minimum damage to the uncut grass.

Even another object is to provide a raking apparatus that is supported on wheels, and which accomplishes the previously stated objects while being highly manoeuverable during operation.

Another object is to provide a wheeled raking apparatus that can make sharp turns during operation while minimizing damage to uncut grass by the wheels or the raking tines.

Still another object is to provide a raking mechanism that includes an internal combustion engine for driving the raking tines.

Yet another object is to provide a raking mechanism having a frame with a tined, rotatable reel thereon, and wherein the reel is immobilized against "float" with respect to the frame, but includes means for adjusting the height of the frame, and hence the reel, with respect to the ground.

Other objects and advantages of the invention will become apparent from the following description, the drawings, and the appended claims.

The present raking mechanism comprises a frame, a side delivery raking mechanism mounted on the frame, a wheel suspension means mounted on the rear of the frame, and a hinging means that interconnects the suspension means with the rear of the frame for vertical pivoting of the suspension means thereon. A steerable first support wheel is mounted on said frame toward the front thereof, a second support wheel is mounted on a wheel axle that is attached to the suspension means toward one side thereof, and a third support wheel that is freely pivotable on a vertical axis is mounted on the suspension means toward the other side thereof. A pivoting control means is also included whereby the suspension means is electively pivotable up and down at the hinging means for adjusting the elevation of the rear of the frame relative to the second and third support wheels.

BRIEF DESCRIPTION OF THE DRAWINGS

FIG. 1 is a perspective view of a raking mechanism constructed in accordance with the present invention.

FIG. 2 is a view of the left side of the raking mechanism shown in FIG. 1, and illustrates the rear wheel suspension system in an upwardly pivoted position in relation to the frame of the mechanism.

FIG. 3 is a front view of the raking mechanism shown in FIG. 1.

FIG. 4 is a view of the right side of the raking mechanism of FIG. 1, and shows the rear wheel suspension system in a downwardly pivoted position relative to the frame of the mechanism.

FIG. 5 is a rear view of the raking mechanism shown in FIG. 1.

FIG. 6 is a top view of the raking mechanism shown in FIG. 1.

DESCRIPTION OF PREFERRED AND ALTERNATIVE EMBODIMENTS

In FIG. 1, the raking mechanism is generally indicated at 1, and comprises a frame having a transverse section 2, a front section 3, and a rear section 4. As shown in the drawings, the front and rear frame sections 3 and 4 are outer ends of a beam 5 that extends longitudinally in parallel relation to the line of draft A—A of the mechanism, and it will be understood that the frame sections 4 and 5 can be separate members that are attached to the front and rear, respectively, of the transverse section whereby the need for a beam member that spans the transverse section is obviated.

In FIGS. 2, 3 and 4, the illustrated raking mechanism embodies a side delivery raking mechanism in the form of a tined, generally cylindroidal, rotatable reel 7 that is mounted on the transverse section 2 of the frame and has an axis of rotation B—B (FIG. 6) that is transverse and oblique in relation to the line of draft A—A of the raking mechanism. Reel 7 comprises first and second reel plates 8 and 9, respectively, which are oriented in confronting parallel alignment and have axes of rotation C and D (FIG. 6) that are parallel but offset laterally. More particularly, reel plates 8 and 9 are equipped with affixed axles 10 and 11, respectively, that extend through pillow block bearings 12 that are attached to the transverse frame section whereby each disc rotates in parallel alignment to the disc cover 13 on the transverse section 2 of the frame. A plurality of rake bars 14 extend obliquely between the reel plates and the ends thereof are secured in bearings 15 affixed to the periphery of the plates, and the bars 14 are hence pivotally mounted to the plates so that they do not rotate on their longitudinal axes but travel back and forth laterally thereon when the plates are rotated on their axles. It will be appreciated, however, that the rake bars are caused to revolve around axis B—B of reel 7 when the reel plates are rotated, even though the bars, per se, do not rotate.

Each of the rake bars 14 has a plurality of rake tines 16 thereon that project downwardly therefrom and travel transversally with respect to the line of draft A—A when the rake is in operation. Various types of raking tines can be employed, and it is preferred that the outer ends thereof be pitched slightly forward with respect to their direction of travel as they sweep through grass being raked. To advantage, spring teeth can be used as tines, and regardless of the type of tines used, it is preferred that the intervals at which they are spaced on the rake bars be relatively small, e.g. the spacing between the tines should not exceed about 1½ inches. Furthermore, the longitudinal axes of the tines should be oriented substantially vertically so as to provide a vigorous raking action as they travel back and forth and up and down upon rotation of the reel. It is also preferred that the side delivery raking means, e.g. reel 7, be immobilized against vertical travel with respect to the frame on which the reel is mounted. More specifically, the reel 7 should be securely fastened to the frame so that it moves up and down with it during operation rather than "floating" thereon.

Power for rotation of the reel 7 can be supplied from any preferred source, e.g. from a tractor by means of a power take-off, from the second support wheel by means of a chain, or from an internal combustion engine mounted on the frame. The drawings illustrate use of a gasoline engine 17 that is attached to one end of the transverse section 2 of the frame. A gear-type speed reducer 18 is attached to the outer end of the crankshaft of the engine to control the rotational speed of the wheel. A jack shaft 19 is driven by means of a belt 20 which is emplaced on pulleys 21 and 22 attached to the output shaft 23 of the speed reducer and to one end of the jack shaft, respectively. The other end of the jack shaft is equipped with a sprocket 24, as is the axle 11 of reel plate 11, whereby the reel 7 is rotated with an endless drive chain 25 upon turning the jack shaft 19 with the engine 17. (The sprocket on axle 11 is concealed from view by chain guard 26.)

Jack shaft 19 is supported by pillow block bearings 27 mounted on a base plate 28 having attached bars 29 that can slide back and forth within bushings 30 that are mounted on transverse frame section 2. Accordingly, the base plate can be shifted away from and toward the engine 17 to effect engagement and disengagement, respectively, of the belt 20 with the pulleys 21 and 22 in order to start and stop rotation of reel 7. Sliding of the base plate to effect such shifting is accomplished by means of a lever 31 having a pivot 32 and interconnected linkage members 33, 34, 35 and 36 which lead from the lever to the base plate. As shown in the drawings, lever 31 includes a hinge 37 so that it can be folded for more convenient storage of the mechanism.

The drawings illustrate use of first, second and third support wheels at 38, 39 and 40, respectively, for conveying the present raking mechanism over the ground. The first support wheel 38 is mounted on the front section 3 of the frame with a pivoting means, generally indicated at 41, whereby wheel 38 is horizontally pivotable for steering the rake as it travels over the ground. Pivoting means 41 comprises a vertically aligned bushing 42 that is attached to front section 3 of the frame, a king pin 43 that is inserted into the bore of the bushing 42 and is rotatable therein, and a U-shaped bracket 44 that interconnects the king pin and the axle 45 of the first wheel. Steering means 46 is used to electively pivot the wheel 38 horizontally, and comprises a tongue 47 that is pivotally attached at 48 to the bracket 44, and a hitch 49 at the outer end of the torque whereby the rake is readily attachable to a towing vehicle 50 (FIG. 2).

The second and third support wheels 39 and 40 are mounted on a wheel suspension means, generally represented at 51, that is hingedly attached to the rear of the transverse frame section 2 for electively pivoting the suspension means, and the attached wheels 39 and 40, up and down thereon. Pivoting of the suspension means when the support wheels are resting on the ground causes the rear of the frame to be raised and lowered as illustrated in FIGS. 4 and 2, respectively, for regulating the degree to which the reel tines 16 enter uncut foilage that is being raked for removal of clippings. Pivoting of the suspension means is accomplished with a jack screw 52 having an upper end 53 that pivotally engages the rear frame section 4 and a lower end 54 that pivotally engages the suspension means 51. The jack screw 52 is operated by means of a hand crank 55. A hydraulic or a pneumatic cylinder can be used as an alternative to the jack screw.

As shown in the drawings, the wheel suspension means 51 comprises a rigid wheel stabilizer 56 in the form of a beam that extends transversally with respect to the frame and has the second and third support wheels mounted thereon adjacent to its ends. Hinging means whereby the suspension means can swing up and down from the frame comprises frame receptacles 57, suspension receptacles 58, an upper pair of connector bars 59, and a lower pair of connector bars 60. The frame receptacles are located on rear members 61 of the transverse frame section 2, whereas the suspension receptacles are located on the stabilizer 56 and the upper end of rigid risers 62 that extend vertically upward from the stabilizer. The upper pair of connector bars 59 are pivotally connected at their outer ends to suspension receptacles 58 on the upper end of the risers, and are pivotally connected at the other end to frame receptacles 57 on an upper frame member 61. The lower pair of connector bars 60 are pivotally connected at their outer ends to suspension receptacles 58 on the stabilizer 56, and are pivotally connected at their inner ends to frame receptacles 57 on a lower frame member 61. The two connector bars in each of the pairs are spaced from each other laterally, and the bars 59 of the upper pair are spaced apart vertically from the bars 60 of the lower pair. All of the bars 59 and 60 are substantially parallel to each other, and struts 63 and 64 interconnect paired bars to lend lateral stability to the generally box-like structure formed by the connector bars and risers.

Upon operating the jack screw 52 by means of crank 55, the connector bars 59 and 60 are caused to pivot up or down on the frame at receptacles 57, and there is a simultaneous upward or downward pivoting of the stabilizer 56 on the connector bars at receptacles 58. Accordingly, the elevation of the stabilizer is raised or lowered relative to the rear of the frame, and when the attached wheels 39 and 40 are on the ground the resulting effect is a raising or lowering of the rear of the frame as the stabilizer is pivoted downward or upward, respectively, in relation to the frame, thereby raising or lowering the height of the tined reel bars 14. Use of a jack screw as the pivoting control means permits precise adjustment of the height of the reel within an adjusting range of several inches. As a consequence, the depth at which the reel tines enter and sweep through grass being raked is subject to considerable latitude in order to accommodate for variations in thickness and surface contour of the turf. An optimum height for the reel is that at which the tines rake both surface deposited and embedded clippings at maximum effectiveness without excessively damaging the stems and roots of the grass. It will be appreciated that the suspension means and the wheels of the present mechanism are unsprung so as to maintain the reel height at a selected elevation during operation. More specifically, the suspension means does not pivot during operation, but remains in a fixed pivoted position until the jack screw is electively turned to deliberately readjust the height of the reel.

The second support wheel 39 on the suspension means is mounted on an axle 65 that is rigidly attached to one end of the stabilizer 56 and aligned perpendicularly to the line of draft A—A. Wheel 39 is thus a tracking wheel that prevents yawing of the vehicle when it rolls over the ground. The third support wheel 40 is attached to the opposite end of the stabilizer 56 with a pivoting means 66 whereby the wheel is freely pivotable horizontally on a vertical axis, thereby permitting the vehicle to make tight turns without scuffing of the turf by the wheels, and it is preferred that the third wheel 40 have a diameter that is smaller than that of the second wheel 39.

Pivot means 66 includes elements for adjusting the elevation of the third support wheel 40 relative to that of the second wheel 39, thereby providing means for leveling the tined reel 7. More specifically, pivoting means 66 comprises a first sleeve 67 having a vertically aligned bore and which is mounted on the end of the stabilizer 56, a second sleeve 68 that is longer than the first sleeve and which is inserted in the bore thereof and slidable therein, an axle 69 for the third wheel, a king pin 70 inserted into the bore of the second sleeve and rotatable therein, a U-shaped bracket 71 that interconnects the axle 69 and the king pin 70, adjusting means, e.g., a lock screw 72, for selectively securing the second sleeve 68 from sliding in the first sleeve 67 and for releasing the second sleeve for sliding therein, whereby the elevation of the third wheel relative to the second wheel is adjustable.

As can be seen in the drawings, and especially FIG. 6, the transverse frame section 2 is aligned at an oblique angle to the line of draft A—A, and it is preferred that the second and third support wheels be correspondingly staggered horizontally so that the connection of each with the stabilizer 56 is about the same distance from the rear of frame section 2. To advantage, the axle 69 of the third wheel 40 can be located forwardly of the axle 65 of the second wheel 39, and it should be noted that stabilizer 56 can be obliquely aligned to the line of draft A—A to facilitate staggering of the wheels.

Additional features not previously described include protective cover panels 73 for the tined reel 7 and a detachable weight 74 on transverse frame section 2 that serves as a counterbalance for the weight of the gasoline engine and reel drive mechanism on the other end of the transverse section.

A raking mechanism has been disclosed herein that fulfills the previously stated objects of the invention, and although the present rake has been described with reference to specific embodiments thereof, it will nonetheless be understood that still other embodiments will become apparent that are within the spirit and scope of the invention defined in the following claims.

What is claimed and desired to secure by Letters Patent is:

1. A yard raking mechanism comprising:
   a. a frame,
   b. a side delivery raking means mounted on said frame,
   c. a wheel suspension means that is attached to the rear of said frame and extends transversely in relation thereto,
   d. a hinging means that interconnects said suspension meams with the rear of said frame for vertical pivoting of the suspension means thereon,
   e. first and second support wheels mounted on said suspension means toward each end thereof, and
   f. pivoting control means whereby said suspension means is electively pivotable on said hinging means in up and down relation to said frame for raising and lowering the rear elevation of the frame.

2. A raking mechanism as in claim 1 wherein said suspension means comprises a rigid wheel stabilizer and said hinging means comprises pivoted connector bars that extend between said frame and said stabilizer.

3. A raking mechanism as in claim 2 wherein said connector bars are spaced apart laterally, are pivotally connected at one end to said frame, and are pivotally connected at the other end to said stabilizer.

4. A raking mechanism as in claim 1 wherein one of said wheels is freely pivotable on a vertical axis, and further comprising a steerable support wheel attached to said frame toward the front thereof.

5. A raking mechanism as in claim 4 and further comprising wheel pivoting means whereby said steerable wheel is pivotable horizontally for steering.

6. A raking mechanism as in claim 5 wherein said wheel pivoting means comprises:
   a. a vertically aligned bushing mounted on said frame,
   b. a king pin inserted in said bore of the bushing and rotatable therein, and
   c. a bracket which interconnects said king pin and said first wheel.

7. A raking mechanism as in claim 6 and further including steering means whereby said first wheel is electively pivoted horizontally.

8. A raking mechanism as in claim 7 wherein said steering means comprises a tongue having one end attached to said bracket.

9. A raking mechanism as in claim 1 wherein said hinging means comprises upper and lower pairs of rigid connector bars, the bars of each of said pair being pivotally connected at one end to said frame and at the other end to said suspension means, the paired connector bars being spaced apart laterally, and the bars of said upper pair being spaced apart vertically from those of said lower pair.

10. A raking mechanism as in claim 9 wherein said suspension means further comprises rigid, vertically extending risers, and said other end of the upper pair of bars are pivotally connected to said risers.

11. A raking mechanism as in claim 1 wherein said pivoting control means comprises a jack screw having one end engaged with said frame and the other end engaged with said suspension means.

12. A raking mechanism as in claim 1 and further comprising means for adjusting the elevation of one of said wheels relative to the other.

13. A raking mechanism as in claim 12 and including:
   a. a first sleeve on said suspension means, said first sleeve having a vertically aligned bore, b. a second sleeve that is longer than said first sleeve and is inserted in said bore and slidable therein, c. an axle for one of said wheels, d. a king pin inserted into the bore of said second sleeve and rotatable therein, e. a bracket that interconnects said axle and said king pin, and f. adjusting means for selectively securing said second sleeve from sliding within said first sleeve and for releasing the second sleeve for sliding therein, whereby the elevation of one wheel relative to the other is adjustable.

14. A raking mechanism as in claim 1 wherein said frame comprises:

a. a transversely extending section for supporting said side delivery raking means, b. a front section which extends forwardly of said transversally extending section, said front wheel being mounted on said front section, and c. a rear section which extends rearwardly of said transversally extending section, and wherein said wheel suspension means are operatively engaged by said pivoting control means for adjusting the elevation of said frame.

15. A raking mechanism as in claim 1 wherein said side delivery raking means comprises a substantially cylindroidal, rotatable reel with an axis of rotation that extends transversely with respect to the line of draft of the rake, and tines mounted on said reel that travel transversally to said line when the rake is in operation.

16. A raking mechanism as in claim 15 wherein said side delivery raking means is immobilized against vertical travel with respect to said frame.

17. A raking mechanism as in claim 15 wherein said reel comprises first and second reel plates located at each end of the reel, said plates being confrontingly aligned and having laterally offset axes of rotation, and a plurality of parallel rake bars that extend obliquely between said reel plates, the ends of the bars being pivotally mounted to the periphery of said plates.

18. A raking mechanism as in claim 17 wherein a plurality of tines are mounted on said bars at spaced intervals along the length thereof, and the longitudinal axes of said tines are oriented substantially vertically.

19. A yard raking mechanism comprising:

a. frame, b. a side delivery raking means mounted on said frame, c. a wheel suspension means mounted on the rear of said frame and which includes a rigid wheel stabilizer that extends transversely with respect to said frame, d. a hinging means that includes upper and lower pairs of rigid connector bars, the bars of each of said pairs being pivotally connected at one end to said frame and at the other end to said suspension means, the paired connector bars being spaced apart laterally, and the bars of said upper pair being spaced apart vertically from those of said lower pair, e. a steerable first support wheel mounted on said frame toward the front thereof, f. a second support wheel mounted on a wheel axle that is attached to said suspension means toward one side thereof, g. a third support wheel that is freely pivotable on a vertical axis and mounted toward the other side of said suspension means, and h. a pivoting control means whereby said suspension means is electively pivotable up and down at said hinging means for adjusting the elevation of the rear of said frame relative to said second and third wheels.

20. A raking mechanism as in claim 19 wherein said suspension means further comprises rigid, vertically extending risers, and said other ends of the upper pair of bars are pivotally connected to said risers.

* * * * *